INVENTOR.
ERWIN F. LITTAU
BY
Brumbaugh, Free, Graves & Donohue
his ATTORNEYS

April 11, 1967 E. F. LITTAU 3,314,072
ELECTROLYTIC RECORDING APPARATUS WITH CONTINUOUSLY
MOVING CONTACT SURFACE
Filed Dec. 31, 1962 2 Sheets-Sheet 2

INVENTOR.
ERWIN F. LITTAU
BY
Brumbaugh, Free, Graves & Donohue
his ATTORNEYS

United States Patent Office 3,314,072
Patented Apr. 11, 1967

3,314,072
ELECTROLYTIC RECORDING APPARATUS WITH CONTINUOUSLY MOVING CONTACT SURFACE

Erwin F. Littau, Stamford, Conn., assignor to Columbia Broadcasting System, Inc., New York, N.Y., a corporation of New York Filed Dec. 31, 1962, Ser. No. 248,649
9 Claims. (Cl. 346—74)

This invention relates to recording apparatus utilizing a flexible tape as the recording medium, and more particularly to such apparatus wherein contact friction between the recording element and the recording medium is substantially eliminated.

In various known recording systems utilizing a flexible tape or strip as the recording medium, a stationary recording element is disposed in contact with the medium, which moves at a relatively rapid rate. The friction engendered between the moving tape and the stationary recording element ultimately produces appreciable wear of the latter, often to an extent where accuracy and resolution of the recorded information is seriously affected. In recording heads wherein stylii composed of fine wires or the like are employed, the wearing away of the contact points sometimes causes complete loss of contact with the recording medium.

It is the principal object of the present invention to provide a novel recording system employing a flexible tape as a recording medium, wherein contact wear between the recording device and the medium is substantially eliminated.

A further object of the invention is to provide an improved recording system wherein the recording medium and the contact point of the recording element both move in the same direction and at substantially the same speed, whereby friction therebetween is substantially eliminated.

Still another object of the invention is to provide an improved high resolution optical recording system utilizing a flexible tape as the recording medium wherein the visual record is produced on the medium with the aid of a contact surface moving in the same direction and at substantially the same speed as the recording medium.

In accordance with the invention, the recording medium, in the form of an elongated flexible tape, is passed over a scanning drum having a raised helical ridge on its peripheral surface. The drum rotates at a speed inducing a surface speed substantially higher than that of the recording medium. The latter is maintained taut and held against the moving helical ridge with sufficient pressure to produce a distended portion thereof at the point of contact with the ridge. The high speed rotation of the scanning drum causes the distended portion or bulge to sweep across the medium repetitively as the medium advances.

In the embodiments illustrated, the recording media are responsive to electrical signals applied thereto to provide the record indication. Contact is made with the surface of the medium as it passes over the drum via an additional strip of flexible tape moving in the same direction and at substantially the same speed as the recording strip. The flexible contact tape is maintained in sufficiently close proximity to the recording medium so that it bears against the distended portion of the medium. Electrical signals indicative of the information to be recorded are applied between respective conductive layers on the recording medium and contact tape and the resultant flow of current through the point of contact produces one element of the character or image to be recorded. By properly synchronizing the electrical signals with the scanning action and movement of the recording medium, any shape character or symbol may be built up from a plurality of such elements.

In one disclosed embodiment, the contact tape is maintained in close proximity to the recording medium by means of a contact roller of diameter relatively small with respect to that of the scanning drum. In another embodiment, the contact tape is held against the recording medium by means of an additional scanning drum having a raised helix thereon and so oriented as to cross the helix on the main scanning drum at an angle, whereby contact area is appreciably reduced. The various embodiments disclosed enable high resolution recording to be obtained, while at the same time reducing or substantially eliminating contact wear between the recording strip and the recording element.

The foregoing, and other objects, features and advantages of the present invention will become more apparent from the following detailed description thereof when taken in conjunction with the accompanying drawings, in which.

In the description to follow, the record medium employed is designed to provide an optical record, although it will be understood that other types of recording are possible within the teaching of the present invention. One type of such optical recording medium is described in copending application Ser. No. 172,177, filed Feb. 9, 1962, for "Optical Recording System and Apparatus," assigned to the present assignee, now abandoned. Briefly, the recording medium described therein comprises a flexible transparent Mylar tape base, of .25 mil thickness, on one side of which are successively deposited a relatively opaque layer of aluminum, in the order of 300 Angstroms thick, and a layer of aluminum oxide in the order of 30 to 50 Angstroms thick. The aluminum oxide layer may be formed on the vapor deposited aluminum by permitting oxidation thereof. Instead of aluminum, bismuth or copper may be used as the metal, with their oxides providing the insulating layer. Along one or both edges of the medium, means are provided for electrical contact with the conductive layer, via a contact strip of metal applied over the conductive layer, or by removing the insulating film and leaving the conductive layer exposed.

As discussed in the aforementioned copending application, the application of relatively small electrical potentials across the thin insulating film results in quantum mechanical tunneling therethrough. Thus, if the potential is applied between a small contact area electrode touching the insulating film, and the conductive layer on the medium, a minute hole will be produced through the opaque insulating and conductive layers, exposing a correspondingly small light transmitting opening in the transparent Mylar backing. Visual images are produced on the medium by application of appropriately selected potentials across the width of the medium as it is advanced past the contact point. The record thereby produced on the medium may be projected on a screen with conventional film projection apparatus.

Figure 1:
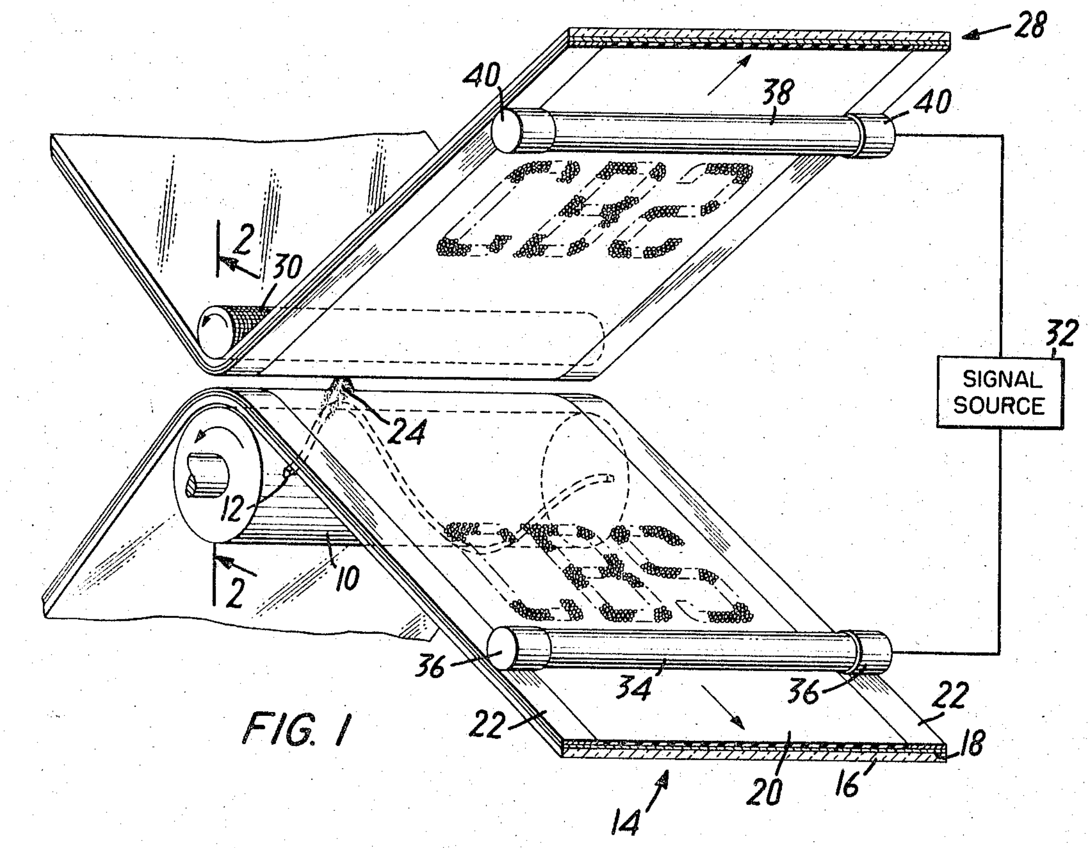
FIGURE 1 is an oblique view in partial section, illustrating one embodiment of the invention.

Referring now to FIGURE 1 of the drawings, the recording arrangement of the present invention is seen to comprise a scanning drum 10 of generally cylindrical form mounted on its axis for rotation by a motor (not shown) in the counterclockwise direction. On the outer peripheral surface of the drum 10 is a helical ridge 12 advancing uniformly along the drum and making one complete turn, in the manner of a single screw thread. The ridge may be formed integrally on the outer surface of the drum 10 by machining of the drum, or more simply, by winding a wire tautly around the outer surface thereof and fixing it in place, such as by welding. As will become apparent, the material of the drum or the ridge is not critical, the only requirement being that it be able to withstand friction against the surface of the relatively soft Mylar tape.

The recording medium is indicated generally at 14 and is composed of a transparent base layer 16 of Mylar or similar tape, on one surface of which is applied a relatively thin layer 18 of opaque conductive material, such as aluminum. On top of the aluminum layer is applied an insulating film 20 of aluminum oxide. Along both edges of the film are arranged conductive strips 22, which may be of copper or other conductive metal, and which are in electrical contact with the conductive layer 18. It will be realized, of course, that the thickness of the recording medium has been greatly exaggerated for purposes of illustration.

The recording medium 14 is maintained taut by a suitable pulley and capstan system (not shown) and overlies the scanning drum 10 along a relatively narrow segment of its circumferential area. Actually, the recording medium is so positioned that the uncoated side of the Mylar base layer 16 rests on or contacts the uppermost portion of the helical ridge 12 only and is slightly spaced from the surface of the drum itself.

Under these conditions, it will be seen that the portion of the ridge 12 contacted by the medium 14 will distend the latter to form a small bulge or raised area 24. As the scanning drum rotates, the distended portion effectively travels across the recording area of the medium between the strips 22. If the medium 14 is now moved longitudinally over the rotating drum 10, the distended portion 24 will accomplish successive scans across its width. In actual practice, the speed of rotation of the drum 10 is made relatively high so that the tangential velocity of the ridge is considerably higher than the longitudinal velocity of the medium itself. The higher the speed of revolution of the drum 10, the greater the number of scans accomplished across the medium per unit length thereof. This affords a means for controlling the resolution of the characters produced on the medium.

Electrical contact for the application of potentials across the insulating film 20 to the conductive film 18 on the recording medium is accomplished by means of an additional flexible tape 28, which is shown to be similar in construction to the recording tape 14. As indicated by the arrow thereon, the tape 28 is moved in the same direction as the recording medium 14 and the speeds thereof are adjusted to be substantially equal.

The inner, or lower, surface of the flexible tape 28 is maintained in contact with the distended portion 24 of the recording medium 14 by means of a contact roller 30, which need not be driven. The latter is made relatively small in diameter as compared to the diameter of the scanning drum 10 so that the radius of curvature of the tape 28 is small in the area of contact. The roller 30 may be made of any material capable of withstanding the frictional engagement with the surface of the Mylar tape and rotates in a counterclockwise direction as shown.

Electrical signals, indicative of the information to be recorded on the medium 14, are applied from a signal source 32 to a pair of contact rollers 34, 38. The former is provided with a pair of contact surfaces 36 arranged to be in rotating electrical contact with the contact strips 22 on the recording medium 14. Similarly, the upper contact roller 38 has a pair of contact surfaces 40 cooperating with the contact strips on the flexible tape 28. The electrical connection from the signal source 32 to the contact surfaces on the rollers 34 and 38 are made through slip rings or other suitable rotating connectors. The contact rollers 34 and 38 may be free wheeling and, if desired, may have their entire outer surfaces formed of conductive material.

The signal source 32 may be a facsimile or television scanning device synchronized with the scanning action of the recording apparatus.

With the recording medium 14 and flexible tape 28 being pulled in the same direction and at substantially the same speeds, and the scanning drum 10 rotating in the direction shown at a relatively high speed, the distended portion 24 repetitively scans across the medium while maintaining contact with the lower surface of the flexible tape 28. The potentials from a signal source 32 applied between the conductive layers on the medium and tape respectively, result in production of transparent areas in the medium 14, as discussed in the aforementioned copending application. Simliar transparent areas are also formed in the flexible contact tape 28. If the signals from the source 32 are in the form of discrete pulses properly synchronized with the movement of the tape and the scanning drum 10, characters of any suitable configuration may be produced on the medium 14. Thus, the letters "CBS" may be optically recorded on the medium 14 in the form of a large number of closely spaced, small transparent areas. At the same time, a mirror image of the recorded information will be produced in the contact tape 28. This of course, will appear properly oriented if the tape 28 is viewed from its uncoated side.

Figure 2:
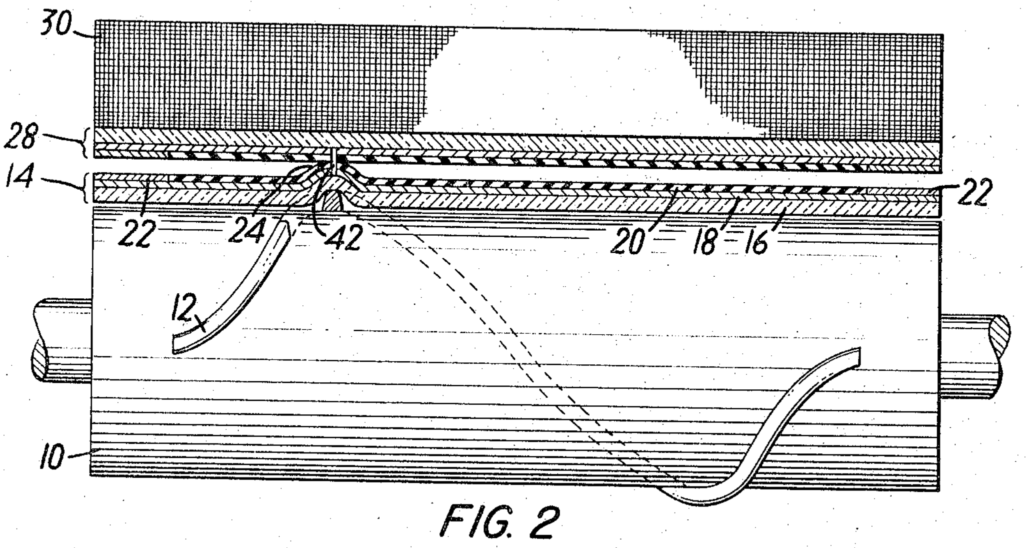
FIGURE 2 is a partial section taken along the lines 2—2 of FIGURE 1, showing in detail the contact achieved by means of the present invention.

The contact area between the recording medium 14 and the contact tape 28 is shown more clearly in FIGURE 2. The ridge 12 on the scanning drum 10 distends the recording medium 14 to form the raised portion 24. The lower surface of the flexible tape 28 contacts the distended portion 24 and, upon application of suitable potentials between the respective conductive layers on the medium 14 and the tape 28, a small, light transmitting opening 42 is formed through the otherwise opaque layers at the point of contact. A large number of these openings 42, appropriately oriented both longitudinally and laterally of the recording medium by means of the scanning action described, produces the recorded image.

The electrical signals applied between the conductive layers on the recording medium and the contact tape may be in the form of pulses to produce discrete, light transmitting spots, or, as indicated in FIGURE 2, a similar effect may be achieved with D.C. signals by grooving or knurling the contact roller 30. As shown, the knurling is oriented parallel and perpendicular to the axis of the roller 30 and, since the distended portion 24 of the record medium 14 does not make effective contact with the tape 28 opposite the valleys between adjacent crests of the knurled surface, has the effect of repetitively breaking contact between the medium and tape, effectively chopping the D.C. signal into a series of closely spaced pulses.

It will be understood from the foregoing, that the contact between the recording medium 14 and the flexible tape 28 is achieved with no relative motion therebetween, and a given contact area on the tape 28, once used, is never used again. Consequently, the deleterious effects of contact wear and deterioration are avoided.

In FIGURES 1 and 2, the contact tape 28 has been shown to be an additional length of the recording medium, on which the recording action of the system produces a similar optical image. Since the function of the tape 28 is merely to provide a contact surface which moves at the same speed and in the same direction as the recording medium 14, it is not necessary that this contact tape be identical to the recording medium. All that is necessary is that the tape 28 include a conductive layer on its lower surface of the same extent as the recording surface on the medium 14. Thus, it may consist merely of a layer of aluminum deposited on the Mylar base, in which case the recording may be achieved on the medium 14 without producing similar records on the contact tape. As a practical matter, however, the cost of the recording medium is sufficiently low so that preparation of a different type of material for the contact tape 28 is not warranted. If the recording produced on the contact tape is not desired, it may be discarded at little cost.

In any recording system, resolution, or fineness of detail, of the recorded image is of prime importance. In the present invention, resolution will depend upon the size of the contact area between the medium 14 and the contact tape 28; the smaller the contact area possible, the greater the resolution. Since two members support the respective flexible surfaces in contact with one another, proper dimensioning thereof can achieve minimal contact area.

The distended portion 24 of the recording medium is produced by the ridge 12 of the scanning drum. For mechanical stability, the height of the ridge has to be in correct proportion to its width. Its height must also be selected to bear the proper relationship to the length and diameter of the scanning drum and moreover, the ridge should not have sharp corners which might cut or crease the medium. For a resolution of one thousand elements per inch, the ridge would be approximately .001 inch wide at its contact edge, and about .003 inch high, on a scanning drum one inch long. In general, a practical arrangement would have ridge width, ridge height, and length of scanner drum related in the ratio of 1 to 3 to 1000.

The contact area is also dependent upon the radius of curvature of the contact tape at the point of contact. It is therefore desirable to maintain the contact tape support roller 30 of as small a diameter as possible. It is recognized that a very small radius of curvature may be achieved with a stationary knife edge as the contact support, but this is impractical because of the damage to the tape that would result from its use.

Figure 3:
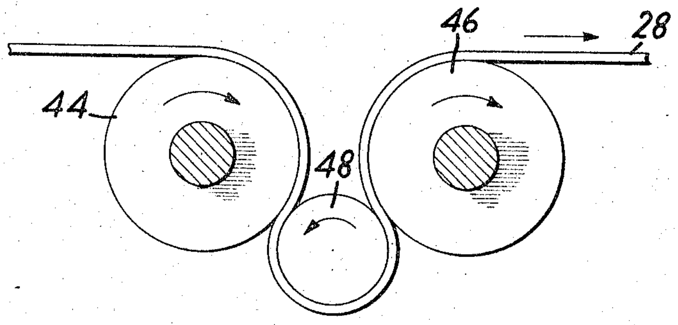
FIGURE 3 is an end view of a suitable contact roller arrangement for use in the embodiment of FIGURE 1.

Since the contact tape 28 must be accurately positioned and maintained taut at all times, a single, self supporting roller, of the type shown in FIGURE 1, may not be of sufficient structural strength where extremely high resolution, and thus small roller diameter, are required. In such a case, the roller arrangement of FIGURE 3 has been found more suitable. As seen from the drawing, a pair of relatively large diameter supporting rollers 44, 46 are mounted sufficiently close to one another to support the relatively smaller diameter contact roller 48. The contact tape 28 is threaded between the support rollers and around the contact roller and the latter is held by the support rollers without additional mounting means. Since structural rigidity is provided by the large supporting rollers 44, 46, the contact roller 48 may be made very small in diameter and resolution of the system may thereby be increased.

Figure 4:
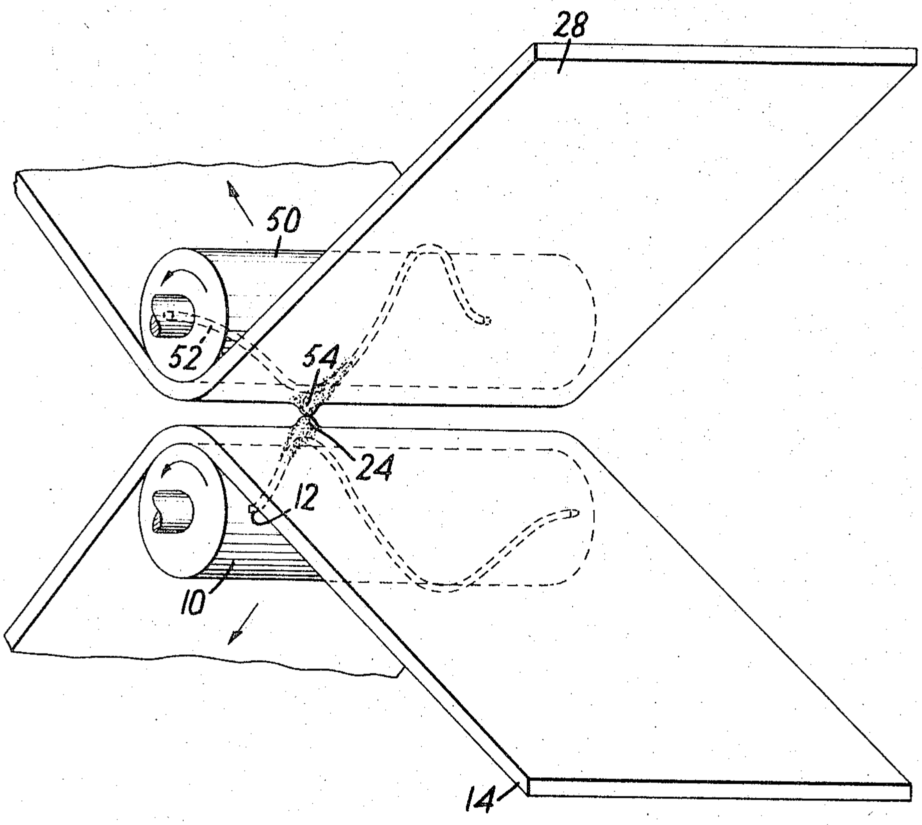
FIGURE 4 is an oblique view of an additional modification according to the invention.

Even greater resolution may be achieved by means of the arrangement shown in FIGURE 4. Instead of the simple roller arrangement of FIGURES 1, 2 and 3, contact between the flexible tape 28 and the medium 14 is achieved by an additional drum 50 provided with a raised ridge on its outer peripheral surface. The drum 50 and its ridge 52 are substantially identical to the scanning drum 10 and its ridge 12, except that the sense of the winding of the helical ridge 52 is opposite to that of the ridge 12.

The ridge 52 produces a distended portion 54 in the contact tape 28, in a manner similar to the production of the distended portion 24 in the medium 14. Since the ridge 52 may be made considerably smaller in width (e.g. .001 inch) than the diameter of a roller 30 or 48, the area of contact between the distended portions 24 and 54 can be considerably reduced. Furthermore, if the pitches of the respective helices are arranged so that at their point of intersection they are approximately at right angles, minimum contact area is achieved. If desired, of course, the pitch of one or both of the helices may be varied, such as by changing the diameter of the drum, to vary the resolution. The smaller contact area in the apparatus of FIGURE 4 enables greater resolution to be achieved at higher scanning speeds.

Although described above in connection with an optical recording medium, it will be understood that the present invention may be applied to any type of continuous recording requiring electrical contact with the recording medium. In accordance with the technique described, extremely small area contact may be achieved while at the same time, substantially eliminating contact friction.

While the fundamental novel features of the invention as applied to further embodiments thereof have been shown and described hereinabove, it will be understood that various substitutions, changes, and modification in the form and details of the apparatus illustrated and its manner of operation may be made by those skilled in the art without departing from the spirit of the invention. It is the intention therefore, to be limited only as indicated by the scope of the following claims.

I claim:

1. In a recording system employing a flexible record medium having a surface responsive to electrical signals to provide the record indication, recording apparatus comprising, a rotatable drum having a helical ridge on the peripheral surface thereof, means for moving said record medium across said drum with said medium maintained taut and wrapped around a portion of said drum so that a portion of said helical ridge and said electrical signal responsive surface is distended outwardly of said drum thereby, a flexible tape including a conductive material on at least one side thereof, means for moving said tape in the same direction as said record medium and for maintaining the outermost surface of said one side in contact with the distended portion only of the electrical signal responsive surface of said record medium, whereby a new portion of said outermost surface is constantly being presented for contact with the distended portion of said signal responsive surface, and means to apply electrical signals between said conductive material and said medium as they move with respect to said rotatable drum.

2. In an optical recording system employing as a record medium a flexible insulating tape having on one side thereof a layer of conductive material over which is applied a layer of insulating material, said medium being responsive to electrical signals applied thereto to vary its light transmitting properties, recording apparatus comprising, a rotatable drum having a helical ridge on the peripheral surface thereof, means for moving said record medium across said drum with the surface of said medium opposite said one side in contact with said helical ridge, said record medium being wrapped around a portion of said drum and maintained taut so as to be distended by said ridge along the area of contact, an additional flexible tape having at least a conductive coating applied to one side thereof, means for moving said additional tape in the same direction with the outermost surface on said one side of said additional tape facing the insulating layer on said medium and in contact with the distended portion only thereof to constantly change the portion of said outermost surface in contact with the distended portion of said medium, and means to apply electrical signals between the conductive layers on said medium and said additional tape as they move with respect to said rotatable drum.

3. The optical recording system of claim 2 wherein said additional flexible tape comprises another length of record medium.

4. In an optical recording system employing as a record medium a flexible insulating tape having on one side thereof a layer of conductive material over which is applied a layer of insulating material, said medium being responsive to electrical signals applied thereto to vary its light transmitting properties, recording apparatus comprising, a rotatable drum having a helical ridge formed on the peripheral surface thereof, means for moving said record medium across said drum with the surface of said medium opposite said one side in contact with a portion of said helical ridge, said record medium being wrapped around a portion of said drum and maintained taut so as to be distended by said ridge, an additional flexible tape having at least a conductive coating applied to one side thereof, means for moving said additional tape in the same direction and at substantially the same speed as said record medium with said one side facing the insulating layer on said medium, roller means for maintaining the outermost surface on said one side of said additional tape in contact with the insulating layer on the distended portion only of said medium, and means to apply electrical signals between the conductive layers on said medium and said additional tape as they move with respect to said rotatable drum.

5. Recording apparatus according to claim 4 wherein said roller means comprises a roller having a diameter substantially smaller than that of said rotatable drum.

6. Recording apparatus according to claim 4 wherein the outer surface of said roller means is knurled, the grooves thereof extending parallel and perpendicular to its axis.

7. Recording apparatus according to claim 4 wherein said roller means comprises a pair of closely spaced support rollers of relatively large diameter and a contact roller of relatively small diameter, said record medium being threaded between said support rollers and around said contact roller whereby said contact roller is supported by said support rollers.

8. In an optical recording system employing as a record medium a flexible insulating tape having on one side thereof a layer of conductive material over which is applied a layer of insulating material, said medium being responsive to electrical signals applied thereto to vary its light transmitting properties, recording apparatus comprising, first and second rotatable drums, each having a helical ridge on the peripheral surface thereof, said respective helical ridges being wound in opposite senses, means for moving said record medium across said first drum with the surface of said medium opposite said one side in contact with a portion of the helical ridge thereon, said record medium being wrapped around a portion of said drum and maintained taut so as to be distended by said ridge, an additional flexible tape having at least a conductive coating applied to one side thereof, means for moving said additional tape in the same direction and at substantially the same speed as said record medium with said one side facing the insulating layer on said medium and the other side being wrapped around a portion of said second drum and maintained taut so as to be distended by the helical ridge on said second drum, said first and second drums being mounted to bring the distended portions only of said medium and said additional tape, respectively, into contact with each other, means to rotate said drums in the same direction and at substantially the same speed, and means to apply electrical signals between the conductive layers on said medium and said additional tape as they move between said drums.

9. Recording apparatus according to claim 8 wherein said additional flexible tape comprises another length of recording medium.

References Cited by the Examiner

UNITED STATES PATENTS

| | | | |
|---|---|---|---|
| 2,391,768 | 12/1945 | Blain | 346—74 |
| 2,444,484 | 7/1948 | Wise et al. | 346—74 |
| 2,858,181 | 10/1958 | Ortlieb | 346—74 |
| 2,971,810 | 2/1961 | Ressler | 346—74 |

FOREIGN PATENTS

| | | |
|---|---|---|
| 536,645 | 5/1941 | Great Britain. |

BERNARD KONICK, *Primary Examiner.*

J. BREIMAYER, *Assistant Examiner.*